S. MOSHER.
Hub and Box for Wheels.
No. 83,083.
Patented Oct. 13, 1868.
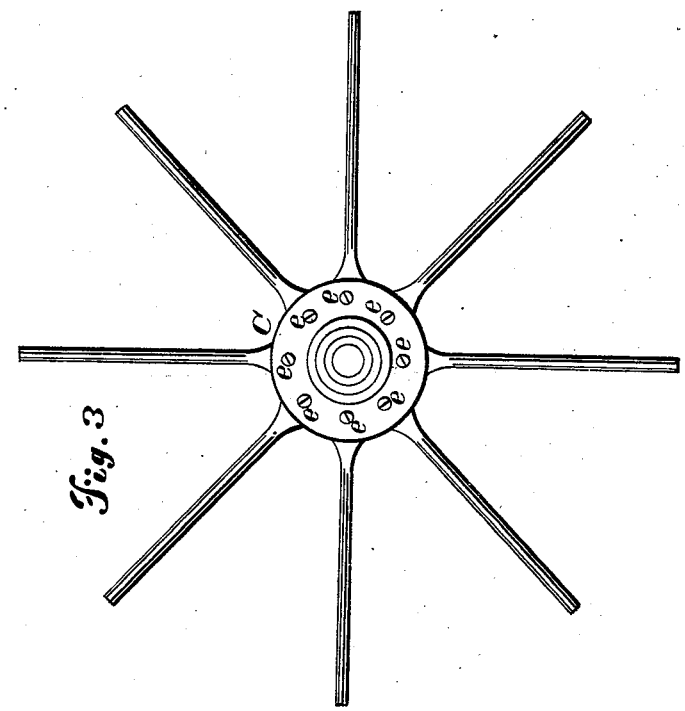
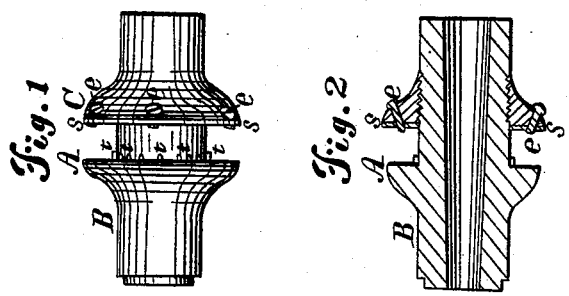

SAMUEL MOSHER, OF WINCHESTER, ILLINOIS.

Letters Patent No. 83,083, dated October 13, 1868.

IMPROVEMENT IN COMBINED HUB AND BOX FOR WHEELS.

The Schedule referred to in these Letters Patent and making part of the same.

*To all whom it may concern:*

Be it known that I, SAMUEL MOSHER, of Winchester, Illinois, have invented certain new and useful Improvements in Combined Hubs and Boxing; and I hereby declare that the following is a true, full, and exact description of the same, reference being had to the accompanying drawings, and to the letters of reference marked thereon, in which—

Figure 1 represents a plan view of my hub and boxing;

Figure 2 is a longitudinal section of the same; and

Figure 3 is a side view of inner flange and spokes in position.

To enable others to make and use my invention, I will now describe its construction and operation.

In the accompanying drawings, A represents the outer flange, which is cast solid with boxing B, and furnished on its interior surface with teeth *t*. Against the said flange, the outer side of the spokes will rest, while the opposite side of the spokes will rest against flange C. The flange C has a female screw cut in the opening through it, which fits on the screw-thread on boxing B.

The object of this arrangement is to allow flange C to be screwed against the base of the spokes when in position. *e* designates a set-screw, of which there may be more than one. Between the inner end of set-screw *e* and the spokes, a washer, *s*, is inserted, which may be made of tin or other plate-metal. This washer is designed to prevent the blunt end of screws from bruising the spokes.

It will be observed that the screw *e* will not penetrate the washer *s*, but merely make an indentation in it and also in the spokes, and thus prevent the jarring motion from unscrewing the flange C, and consequently loosen the spokes. Should the spokes become loose by shrinkage, in order to tighten them, first unscrew the set-screw *e*, and screw up the flange C against them.

What I claim, and desire to secure by Letters Patent, is—

The combination of set-screws *e* with flange C and washer *s*, the whole constructed and arranged substantially as specified.

In testimony that I claim the foregoing as my own act, I hereby affix my signature in the presence of two witnesses.

SAMUEL MOSHER.

Witnesses:
E. H. GRAY,
W. W. CHAPMAN.